United States Patent
Ammon et al.

(10) Patent No.: US 7,422,089 B2
(45) Date of Patent: Sep. 9, 2008

(54) DRIVE UNIT FOR AN ELEVATOR

(75) Inventors: Urs Ammon, Ebikon (CH); Andrzej Cholinski, Ebikon (CH); Christian Lüthi, Lucerne (CH)

(73) Assignee: Inventio AG, Hergiswil NW (CH)

( * ) Notice: Subject to any disclaimer, the term of this patent is extended or adjusted under 35 U.S.C. 154(b) by 615 days.

(21) Appl. No.: 10/801,912

(22) Filed: Mar. 16, 2004

(65) Prior Publication Data
US 2004/0182652 A1    Sep. 23, 2004

(30) Foreign Application Priority Data
Mar. 20, 2003    (EP)    .................. 03405194

(51) Int. Cl.
*B66B 1/06* (2006.01)
*B66B 11/08* (2006.01)
*H02P 7/00* (2006.01)

(52) U.S. Cl. .................. 187/277; 187/256; 187/258; 187/391; 318/105; 318/495

(58) Field of Classification Search .................. 187/277, 187/391, 256, 258
See application file for complete search history.

(56) References Cited

U.S. PATENT DOCUMENTS

| | | | |
|---|---|---|---|
| 4,804,067 A * | 2/1989 | Kahkipuro | 187/296 |
| 5,010,981 A | 4/1991 | Heikkinen | |
| 5,012,899 A * | 5/1991 | Iwata | 187/277 |
| 5,019,960 A * | 5/1991 | Ando et al. | 700/3 |
| 5,229,558 A * | 7/1993 | Hakala | 187/293 |
| 5,734,135 A * | 3/1998 | Hakala et al. | 187/292 |
| 5,894,910 A * | 4/1999 | Suur-Askola et al. | 187/290 |
| 5,896,948 A * | 4/1999 | Suur-Askola et al. | 187/290 |
| 6,199,666 B1 | 3/2001 | Aulanko et al. | |
| 6,220,395 B1 * | 4/2001 | Hakala et al. | 187/277 |
| 6,234,275 B1 * | 5/2001 | Hakala et al. | 187/277 |
| 6,367,587 B2 * | 4/2002 | Hakala et al. | 187/256 |
| 6,371,248 B1 * | 4/2002 | Cholinski | 187/254 |
| 6,429,554 B1 * | 8/2002 | Albrich et al. | 318/495 |
| 6,467,583 B1 * | 10/2002 | Koura et al. | 187/247 |
| 6,471,011 B1 * | 10/2002 | Ando et al. | 187/247 |
| 2005/0224296 A1 * | 10/2005 | Smith et al. | 187/277 |

FOREIGN PATENT DOCUMENTS

| | | |
|---|---|---|
| DE | 196 34 629 | 8/1997 |
| EP | 0 565 893 | 10/1993 |
| EP | 1 220 426 | 7/2002 |
| JP | 51 20351 | 2/1976 |

* cited by examiner

*Primary Examiner*—Lincoln Donovan
*Assistant Examiner*—Eduardo Colon-Santana
(74) *Attorney, Agent, or Firm*—Fraser Clemens Martin & Miller LLC; William J. Clemens

(57) ABSTRACT

An elevator drive unit including a traction sheave supported by a shaft rotatably supported by a pair of bearings. Mounted on opposite free ends of the shaft are rotors of a pair of electric motors. Cage-housings on a pair of spaced bearing end-plates retain the stators of the motors. A plurality of frequency converters operating in a master/slave mode to supply electrical power to the motors.

17 Claims, 4 Drawing Sheets

DRIVE UNIT FOR AN ELEVATOR

BACKGROUND OF THE INVENTION

The present invention relates to a drive unit for an elevator comprising motors and a traction sheave wherein the traction sheave and the motors are supported on bearing end-plates arranged on a machine frame.

There is shown in the European patent application EP 0 565 893 a drive unit for elevators which, between two bearing end-plates, has a traction sheave and electric motors which can be mechanically coupled in series. The rigidly series-coupled external-rotor motors are synchronized by means of a multi-motor speed control. The traction sheave and the motors are supported on a rigid axle supported by the bearing end-plates.

A disadvantage of this known device is that the forces acting on the rigid axle are unfavorably distributed. The main forces emanating from the traction sheave must largely be absorbed by the bearing end-plate. Also, the series-coupled electric motors make large distances between bearing end-plates necessary.

SUMMARY OF THE INVENTION

The present invention concerns a compact elevator drive unit. The drive unit includes: a pair of spaced apart bearing end-plates mounted on a machine frame, each of the bearing end-plates retaining an associated bearing; a pair of electric motors, each of the motors being supported by an associated one of the bearing end-plates; a shaft having opposed free ends, the shaft being rotatably supported by the bearings, each of the free ends of the shaft being drivingly connected to an associated one of the motors; and a traction sheave supported by the shaft for rotation by the motors. A plurality of frequency converters is connected to the motors for operation in a master/slave mode.

The advantages achieved by the present invention are essentially that a drive unit with a short shaft and therefore a short overall length of the drive unit can be realized. It is also advantageous that the traction sheave is held in bearings at both ends and the electric motors can be arranged symmetrically relative to the traction sheave, which makes the drive unit usable in the highest performance segment.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
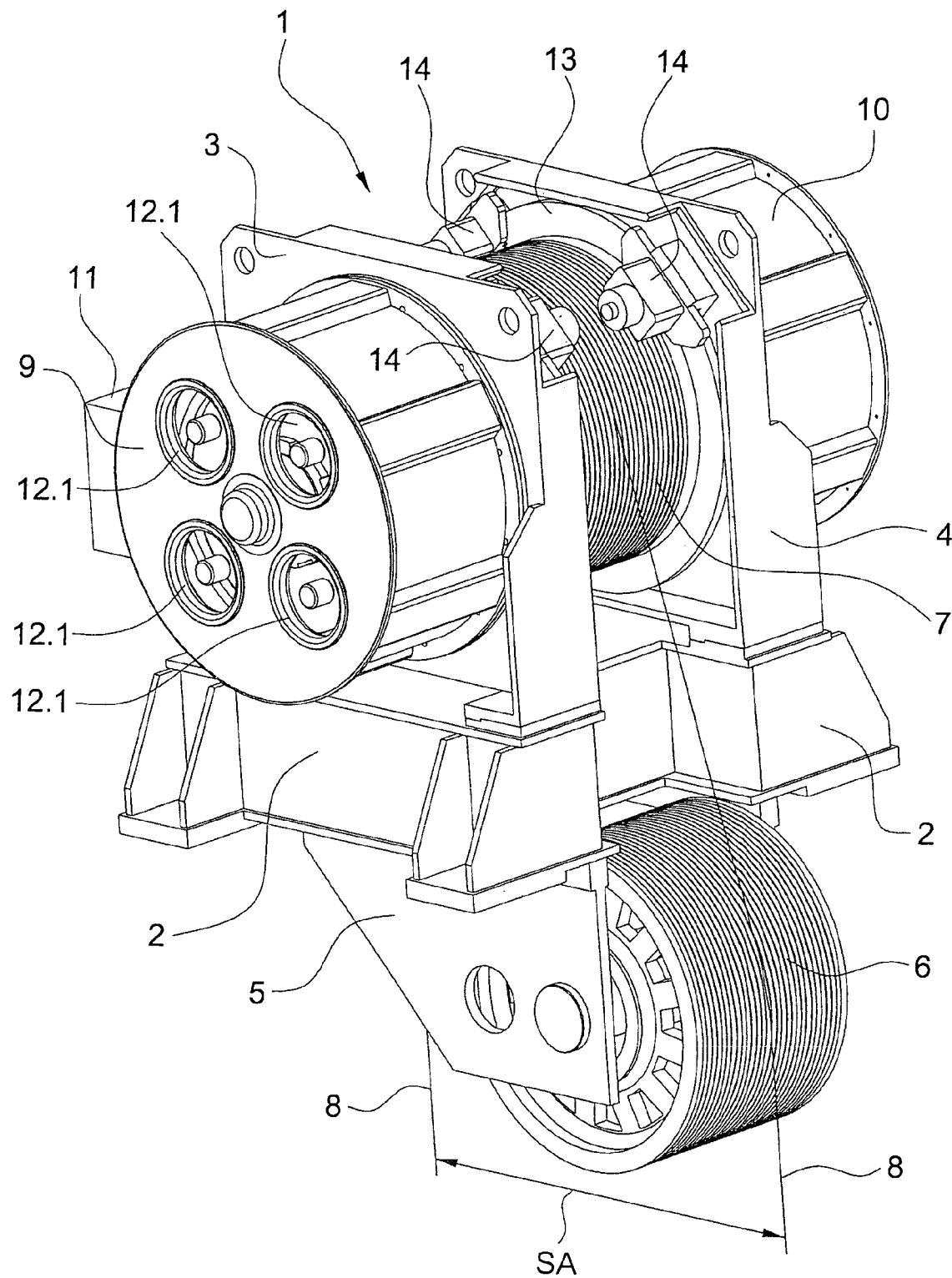
FIG. 1 is a view of a drive unit according to the present invention.

FIG. 1 shows a completely assembled drive unit 1, consisting essentially of a machine frame 2 on which a first bearing end-plate 3 and a second bearing end-plate 4 are arranged. Also arranged on the machine frame 2 is a secondary-sheave mounting 5 with a secondary sheave 6. The bearing end-plates 3, 4 support a traction sheave 7 over which ropes 8 are guided, the ropes 8 being also guided over the secondary sheave 6. A distance SA is required between the rope-fall of an elevator car (not shown) and a counterweight (not shown).

Figure 2:
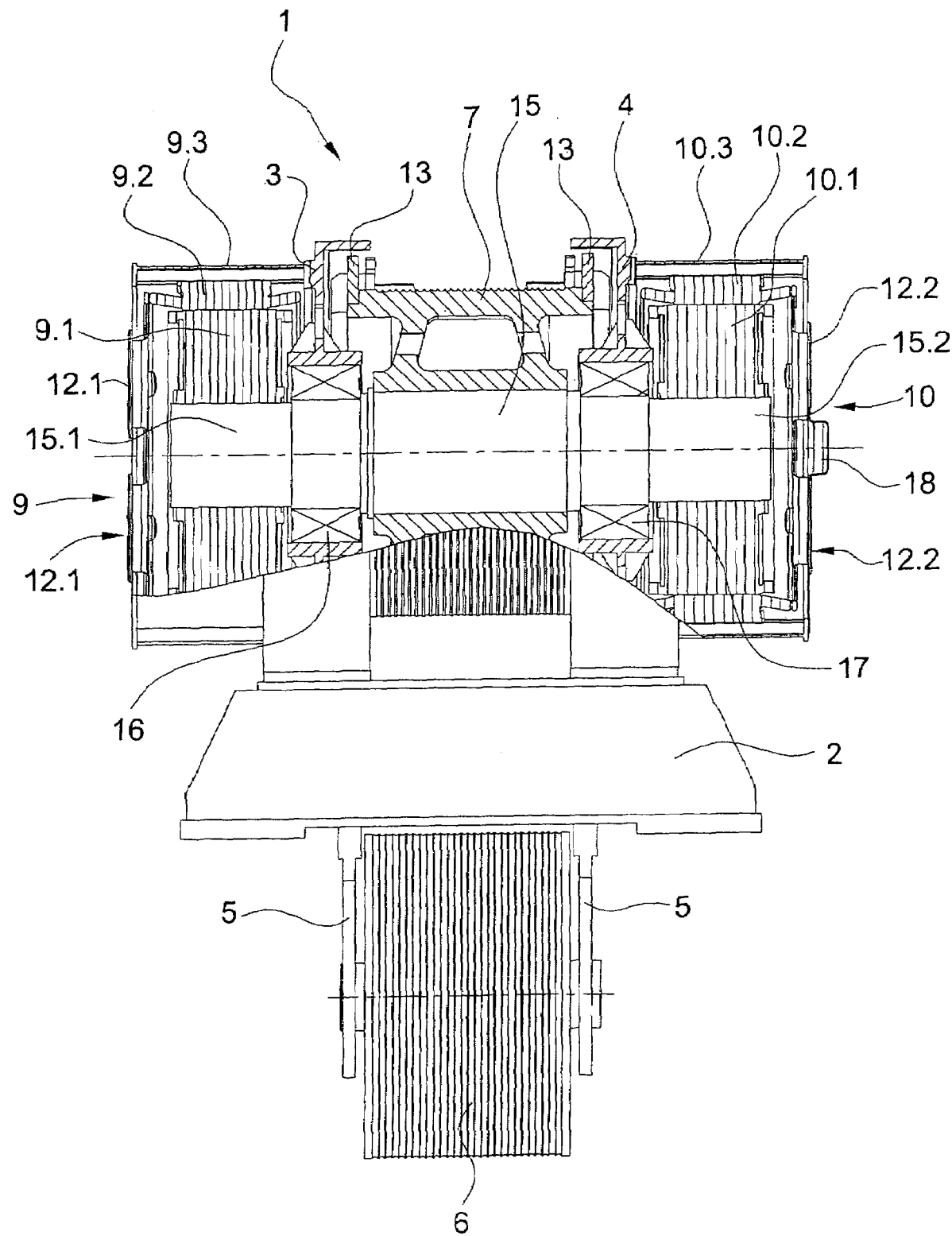
FIG. 2 is a cross-sectional view taken through the drive unit shown in FIG. 1 along its shaft.

Arranged on the first bearing end-plate 3 is a first motor 9, and on the second bearing end-plate 4 a second motor 10. Each of the motors 9, 10 is provided with a terminal box 11 and with fans 12.1, 12.2 (FIG. 2). The traction sheave 7 has on each side a brake disk 13 on which two disk brakes 14 act.

FIG. 2 shows a cross-section through the drive unit 1. The traction sheave 7 is supported by a shaft 15, the shaft 15 being held rotatably in a first bearing 16 of the first bearing end-plate 3 and in a second bearing 17 of the second bearing end-plate 4. A first free-end of the shaft 15 is indicated with 15.1, and a second free-end of the shaft 15 is indicated with 15.2. Mounted on the first free-end 15.1 of the shaft 15 is a first rotor 9.1 of the first motor 9. Arranged on the first bearing end-plate 3 by means of a first cage-housing 9.3 is a first stator 9.2. Similarly, the second free-end 15.2 mounts a second rotor 10.1, and the second bearing end-plate 4 has arranged thereon a second stator 10.2 and a second cage-housing 10.3 of the second motor 10. A tachogenerator 18 is coupled with the shaft 15 and is provided to register the rotational speed of the shaft.

Figure 3:
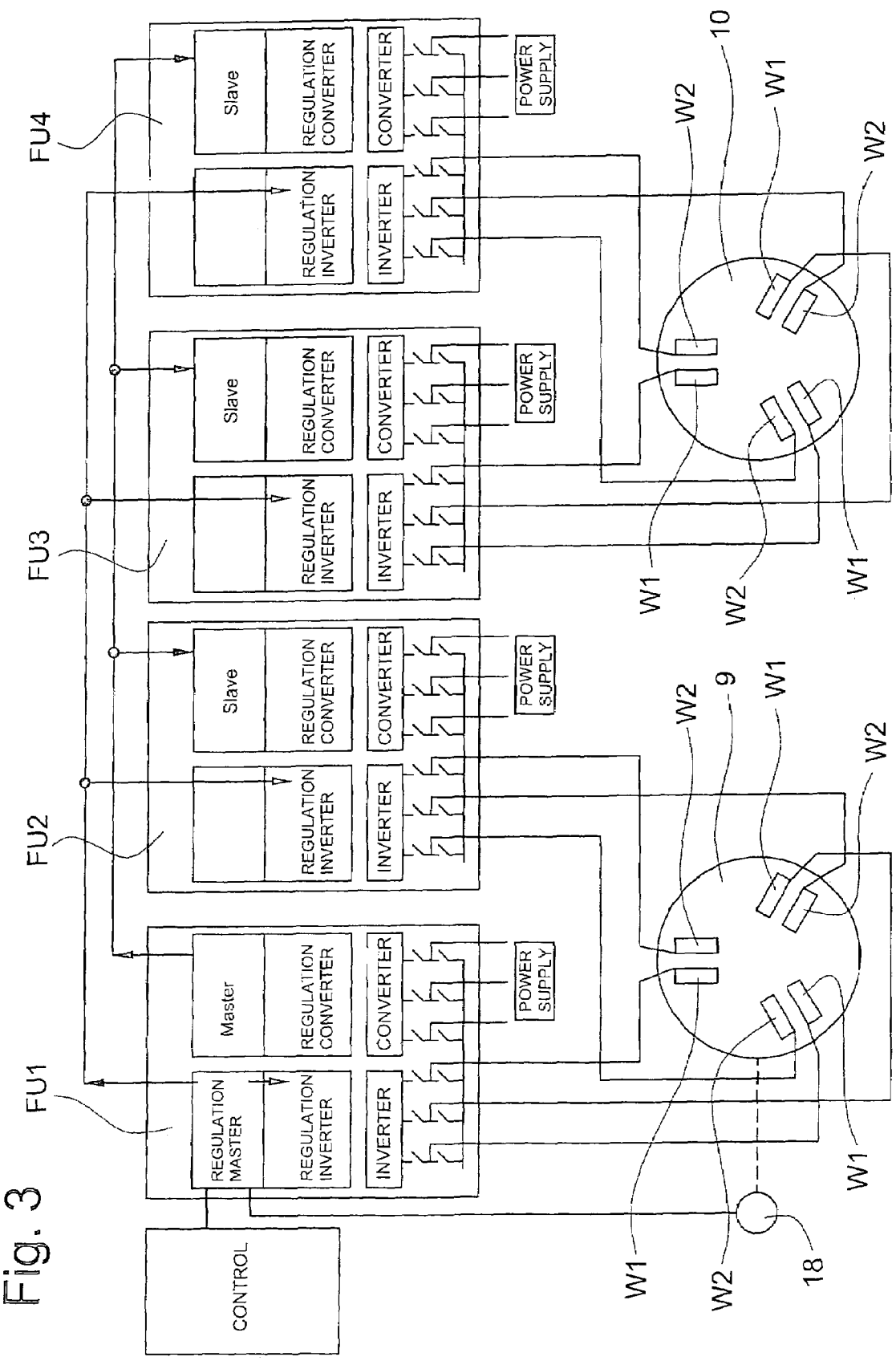
FIGS. 3 and 4 are schematic diagrams of an electric power supply utilized with the drive unit shown in FIGS. 1 and 2.
Figure 4:
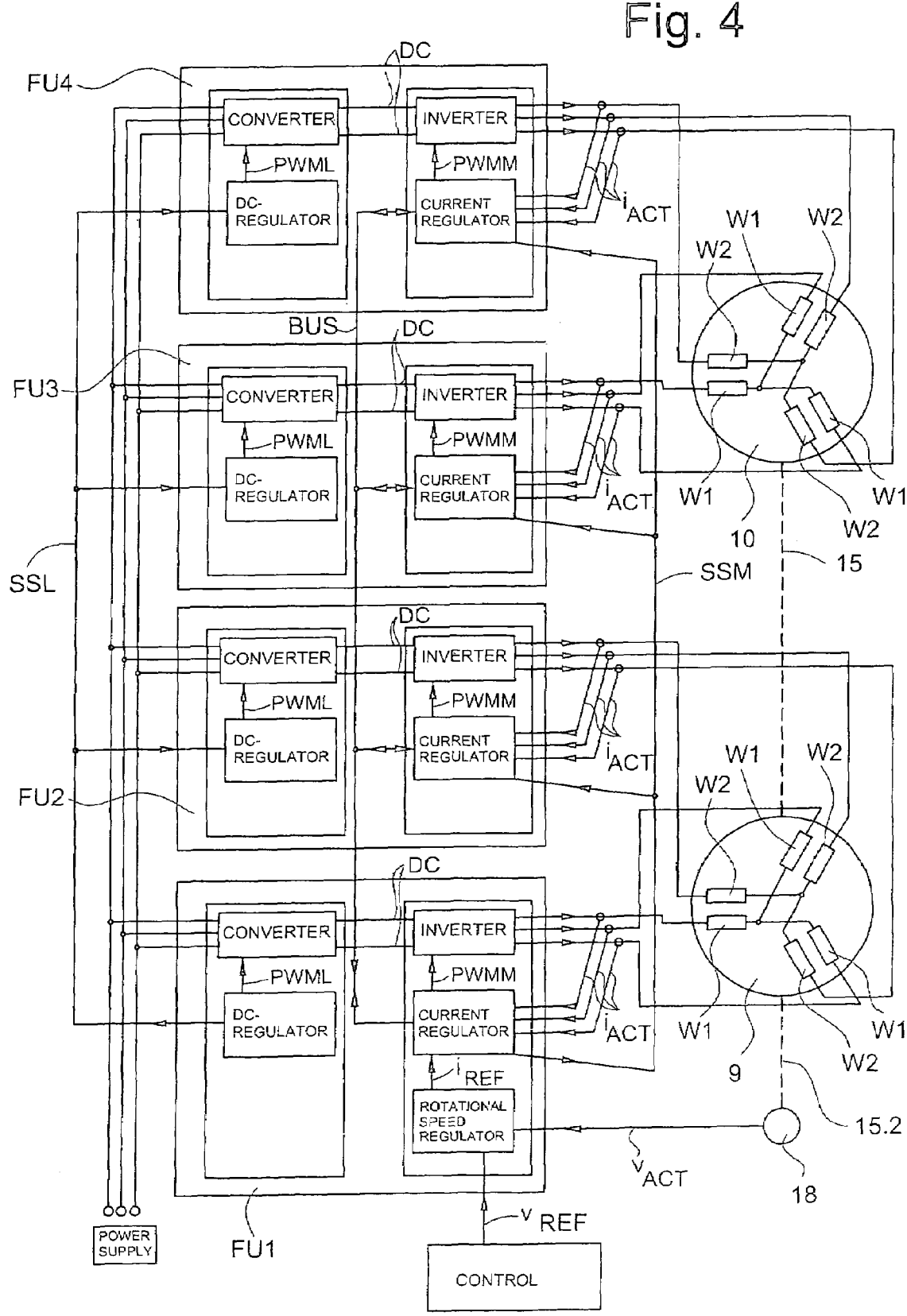

FIGS. 3 and 4 show an electric power supply for the drive unit 1, more specifically the motors 9, 10. The motors 9, 10 are of three-phase construction, each motor having a first winding-set W1 and second winding-set W2, the windings of one winding-set being mechanically connected in parallel with the corresponding windings of the other winding-set. The first winding-set W1 of the motor 9 is connected to the output of a first frequency converter FU1. The second winding-set W2 of the motor 9 is connected to the output of a second frequency converter FU2.

The first winding-set W1 of the motor 10 is connected to the output of a third frequency converter FU3. The second winding-set W2 of the motor 10 is connected to the output of a fourth frequency converter FU4. The winding-ends at one end of each winding-set W1, W2 are connected in a star formation. The system requires the outputs of the frequency converters FU1, FU2, FU3, FU4 to be connected together in an electrically isolated manner, which is possible by means of several winding-sets W1, W2 of the motors 9, 10 which are to be supplied with electric power provided that the motors 9, 10 are rigidly coupled by means of the shaft 15.

The frequency converter FU1 is determinant for the other frequency converters FU2, FU3, FU4, the frequency converters operating in master/slave mode. The frequency converter FU1 determines based on an actual value of the rotational speed $V_{ACT}$ of the tachogenerator 18, and based on the reference value of the rotational speed $V_{REF}$ of an elevator control (CONTROL), the references for the inverter regulation. The frequency converter FU1 also produces the references for the converter regulation. A converter (CONVERTER) is connected to a power supply (POWER SUPPLY) and, depending on the converter regulation, generates the voltage of a DC link DC to which an inverter (INVERTER) is connected. An actual value of the rotational speed $V_{ACT}$ and a reference value of the rotational speed $V_{REF}$ are supplied to a rotational-speed regulator (ROTATIONAL SPEED REGULATOR) which determines a reference value for the current $i_{REF}$ of the motors 9, 10. The current of the three-phase winding-sets W1, W2 is registered for each phase and fed as an actual current value $I_{ACT}$ to a current regulator (CURRENT REGULATOR), which generates from the reference value of the current (portion of the reference value of the current $i_{REF}$) and an actual value of the current $I_{ACT}$ regulator signals (PWMM) for the switch of the inverter (INVERTER) which is connected to the voltage of the DC link DC. With regard to structure and function, the current regulator (CURRENT REGULATOR) and the inverter (INVERTER) of the other frequency converters FU2, FU3, FU4 are comparable to the master frequency converter FU1. The specification of the amplitude of the reference value of current for the current regulator (CURRENT REGULATOR) of the frequency converters FU2, FU3, FU4 takes place via a bidirectional bus (BUS). All other communication between the frequency converters FU1, FU2, FU3, FU4 (error handling, internal monitoring, identification of the frequency converters, etc.) also takes place via this bus (BUS).

The master frequency converter FU1 determines by means of the rotational-speed regulator (ROTATIONAL SPEED REGULATOR) the total current $i_{REF}$ which is distributed to all of the frequency converters FU1, FU2, FU3, FU4. The underlying current regulator (CURRENT REGULATOR) operates on, for example, the principle of vector regulation, transmission of the transformation angle of the reference value of the current from the master frequency converter FU1 to the slave frequency converter FU2, FU3, FU4 taking place via the unidirectional bus (BUS).

The voltage of the DC link DC is generated by the converter (CONVERTER), which is connected to the three-phase power supply (POWER SUPPLY). The switch of the converter (CONVERTER) is controlled by means of control signals (PWML) which are generated by the converter regulator (DC REGULATOR). With regard to structure and function, the converter regulator (DC REGULATOR) and the converter (CONVERTER) of the other frequency converters FU2, FU3, FU4 are comparable to the master frequency converter FU1, synchronization of the converter (CONVERTER) of the frequency converters FU2, FU3, FU4 taking place by means of a timing signal of the frequency converter FU1 via the unidirectional bus SSL.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A drive unit for an elevator comprising:
   a pair of spaced apart bearing end-plates mounted on a machine frame, each of said bearing end-plates retaining an associated bearing;
   a pair of electric motors, each said motor supported by an associated one of said bearing end-plates;
   a shaft having opposed free ends, said shaft being rotatably supported by both of said bearings, each of said free ends of said shaft being drivingly connected to an associated one of said motors; and
   a traction sheave supported by said shaft for rotation by said motors.

2. The drive unit according to claim 1 wherein each of said motors has a rotor arranged on said associated free-end of said shaft and a stator mounted on said associated bearing end-plate by an associated cage-housing.

3. The drive unit according to claim 1 including at least one brake disk attached to said traction sheave and at least one disk brake acting on said at least one brake disk.

4. The drive unit according to claim 1 wherein said motors are connected to a plurality of frequency converters operating in a master/slave mode.

5. The drive unit according to claim 4 wherein one of said frequency converters is a master frequency converter that specifies a total current distributed among said frequency converters, and each of said frequency converters includes a current regulator for regulating a current based upon a reference current value and an actual current value.

6. The drive unit according to claim 4 including at least one bus system connecting said frequency converters for communicating at least one of reference-current signals, synchronization signals and identification signals.

7. The drive unit according to claim 4 including a tachogenerator coupled to said shaft and connected to said frequency converters for generating a signal representing an actual rotational speed of said shaft.

8. The drive unit according to claim 1 including a secondary-sheave mounting attached to said machine frame and a secondary sheave rotatably mounted on said secondary-sheave mounting.

9. A drive unit for an elevator comprising:
   a pair of spaced apart bearing end-plates mounted on a machine frame, each of said bearing end-plates retaining an associated bearing;
   a pair of electric motors, each said motor supported by an associated one of said bearing end-plates;
   a shaft having opposed free ends, said shaft being rotatably supported by both of said bearings, each of said free ends of said shaft being drivingly connected to an associated one of said motors;
   a traction sheave supported by said shaft for rotation by said motors; and
   a plurality of frequency converters connected to said motors and operating in a master/slave mode.

10. The drive unit according to claim 9 wherein one of said frequency converters is a master frequency converter that specifies a total current distributed among said frequency converters, and each of said frequency converters includes a current regulator for regulating a current based upon a reference current value and an actual current value for said associated motor.

11. The drive unit according to claim 10 wherein said master frequency converter generates said reference current value.

12. The drive unit according to claim 9 including at least one bus system connecting said frequency converters for communicating at least one of reference-current signals, synchronization signals and identification signals.

13. The drive unit according to claim 9 including a control connected to a one of said frequency converters operating as a master frequency converter, said control generating a signal representing a reference rotational speed of said shaft, and a tachogenerator coupled to said shaft and connected to said control for generating a signal representing an actual rotational speed of said shaft.

14. The drive unit according to claim 9 including a secondary-sheave mounting attached to said machine frame and a secondary sheave rotatably mounted on said secondary-sheave mounting.

15. A drive unit for an elevator comprising:
   a pair of spaced apart bearing end-plates mounted on a machine frame, each of said bearing end-plates retaining an associated bearing;
   a pair of electric motors, each said motor having a stator mounted on an associated one of said bearing end-plates;
   a shaft having opposed free ends, said shaft being rotatably supported by both of said bearings, each of said free ends of said shalt extending beyond an associated one of said bearings and having mounted thereon a rotor of an associated one of said motors; and a traction sheave supported by said shaft between said bearing end-plates for rotation by said motors.

16. The drive unit according to claim 15 wherein each of said stators is mounted on said associated bearing end-plate by an associated cage-housing.

17. The drive unit according to claim 15 including at least one brake disk attached to said traction sheave and at least one disk brake acting on said at least one brake disk.

* * * * *